US011829985B1

(12) United States Patent
Ducker et al.

(10) Patent No.: US 11,829,985 B1
(45) Date of Patent: Nov. 28, 2023

(54) MACHINE LEARNING SYSTEM FOR ROUTING PAYMENT REQUESTS TO DIFFERENT CUSTOMER ACCOUNTS

(71) Applicant: Chime Financial, Inc., San Francisco, CA (US)

(72) Inventors: Michael Ducker, San Francisco, CA (US); Taylor Lentz, Oakland, CA (US); Tilo Sloboda, San Jose, CA (US)

(73) Assignee: Chime Financial, Inc., San Francisco, CA (US)

(*) Notice: Subject to any disclaimer, the term of this patent is extended or adjusted under 35 U.S.C. 154(b) by 245 days.

(21) Appl. No.: 17/038,554

(22) Filed: Sep. 30, 2020

(51) Int. Cl.
*G06Q 20/22* (2012.01)
*G06N 20/00* (2019.01)
*G06Q 20/02* (2012.01)
*G06Q 20/40* (2012.01)

(52) U.S. Cl.
CPC ............ *G06Q 20/227* (2013.01); *G06N 20/00* (2019.01); *G06Q 20/027* (2013.01); *G06Q 20/405* (2013.01)

(58) Field of Classification Search
CPC .............. G06Q 20/227; G06Q 20/027; G06Q 20/405; G06N 20/00
See application file for complete search history.

(56) References Cited

U.S. PATENT DOCUMENTS

| | | | | |
|---|---|---|---|---|
| 2007/0260537 A1* | 11/2007 | Stone | ................... | G06Q 20/042 705/39 |
| 2008/0147549 A1* | 6/2008 | Rathbun | ................ | G06Q 20/40 705/44 |
| 2012/0265678 A1* | 10/2012 | Ross | ...................... | G06Q 40/02 705/42 |
| 2013/0226798 A1* | 8/2013 | Orttung | ................ | G06Q 20/027 705/44 |
| 2015/0012425 A1* | 1/2015 | Mathew | ................. | G06Q 20/36 705/41 |
| 2016/0321658 A1* | 11/2016 | Unser | ................... | G06Q 20/405 |
| 2020/0074449 A1* | 3/2020 | Novis | ................... | G06Q 20/227 |
| 2020/0202330 A1* | 6/2020 | Novis | .................... | G06N 3/045 |

(Continued)

FOREIGN PATENT DOCUMENTS

| WO | WO-2010083454 A2 * | 7/2010 | ........... G06Q 20/102 |
|---|---|---|---|
| WO | WO-2013188241 A3 * | 4/2014 | ............. E21B 44/00 |

OTHER PUBLICATIONS

Anonymous. IP.com No. IPCOM000257024D (Year: 2019).*

Primary Examiner — Bennett M Sigmond
Assistant Examiner — James H Miller
(74) Attorney, Agent, or Firm — Keller Preece PLLC (57) ABSTRACT

A transaction approval system makes an assessment in real time whether to approve a purchase transaction and to select an account of the customer to fund the purchase transaction. The transaction approval system can use a machine learning model to select the appropriate account of the customer to fund a purchase transaction that satisfies one or more preferences or goals established by the customer or the system. The machine learning model can receive, as inputs, information on one or more of the customer's accounts, user preference information, information regarding the transaction and/or information regarding prior transactions by the customer and use the inputs and machine learning model to make a selection of a customer account that satisfies the preferences or goals established by the customer or system.

20 Claims, 5 Drawing Sheets

(56) References Cited

U.S. PATENT DOCUMENTS

| | | | |
|---|---|---|---|
| 2021/0027357 A1* | 1/2021 | Bonfigli | G06Q 30/0224 |
| 2021/0042723 A1* | 2/2021 | Walters | G06Q 20/102 |
| 2021/0201316 A1* | 7/2021 | Lunceford | G06Q 20/401 |

* cited by examiner

MACHINE LEARNING SYSTEM FOR ROUTING PAYMENT REQUESTS TO DIFFERENT CUSTOMER ACCOUNTS

BACKGROUND

The disclosure generally relates to the field of machine learning, and more particularly to applying machine learning algorithms for intelligently routing payment requests by a customer to different accounts held by the customer based on financial goals and health.

Customer payments for goods and services via a payment device (e.g., a debit card) is ubiquitous, due in part to the ease and speed of such transactions. In a retail setting, a merchant determines a total cost for a transaction, and the customer's payment device is accessed to retrieve information about a bank account linked to the device. Once the customer approves the transaction, the transaction is sent to the device issuer, who in turn determines whether to approve or deny the transaction. If approved, funds are transferred from the customer's bank account linked to the payment device to a financial account of the merchant (the merchant's bank). However, the transfer of funds from the account linked to the payment device may not be advantageous for the customer. For example, there may be costs (e.g., transaction fees) incurred with the withdrawal funds from the account linked to the payment device. In addition, depending on the type of transaction, the customer may have allocated money for the transaction in a different account held by the customer and then the customer has to take the time and effort to transfer money between accounts in order to properly balance the funds in the customer's accounts to match the customer's intentions. Solutions that provide greater flexibility in determining an appropriate account (of the customer) to provide funds for a transaction are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

Wherever possible, the same reference numbers are used throughout the drawings to refer to the same or like parts. The drawings are not to scale.

DETAILED DESCRIPTION

The present disclosure generally pertains to machine learning algorithms for intelligently routing payment requests by a customer to different accounts owned by the customer based on the customer's financial goals and financial health. The routing of payment requests to the different accounts can be performed by a transaction approval system that is also responsible for determining whether the payment request initiated by the customer should be approved. The routing of the payment request to one or more customer accounts by the transaction approval system may automatically change or override any pre-existing relationship between a particular customer account and the customer's method of payment (e.g., a debit card of the customer that is linked to a specific customer account) in order to satisfy a goal or preference of the customer or the system (on behalf of the customer).

As an example, a financial entity may provide numerous accounts to a customer e.g., a checking account, a savings account, a credit card, etc. Rather than having a customer's particular payment device (e.g., a debit card) linked solely to a particular account of the customer, the financial entity (via the transaction approval system) can intelligently make a decision to take money from a selected account of the numerous accounts held by the customer, wherein the selection of the account by the financial entity is made in furtherance of a financial goal. The selection of the account can be made by the financial entity and the money deducted from the selected account by the financial entity without the need for real-time or subsequent approval by the customer. That is, even if a customer uses a payment device (e.g., swipes a card) associated with a first account of the customer, the funds may actually be deducted by the financial entity from a second, different account of the customer not specifically associated with the card, so long as the second account is selected in furtherance of the customer's goal. In an embodiment, the goal can be to reduce the costs to the customer for the transaction, but other embodiments may implicate the customer's personal priorities for their money and accounts. In some embodiments, the payment request could be satisfied by multiple accounts selected by the financial entity or by permitting the customer to maintain a negative balance (e.g., in situations where the customer is expected to receive a deposit of funds that would make the customer's balance positive). In another embodiment, rather than deduct from a customer account at the financial entity (e.g., if the customer does not have sufficient funds in the customer's accounts), the financial entity could advance some or all of the funds for the purchase to the customer. The financial entity may or may not request repayment of the funds directly from the customer or may send an automated clearing house (ACH) instruction to a third-party bank that partners with financial entity to provide the funds.

The transaction approval system can evaluate numerous factors when making a decision regarding which account(s) of the customer to use to fund a payment request. The factors evaluated by the transaction approval system can include transaction related factors (e.g., transaction type, the merchant, the goods or services being purchased, and the date), customer account related factors (e.g., account type, account balance, and account purpose), customer goals or preferences (e.g., account designations or restrictions established by the customer, and minimizing costs), and historical information (e.g., previous types of transactions and payment history). After evaluating the factors, the transaction approval system can then select the appropriate account (or accounts) of the customer to fund a payment request that is advantageous to the customer and satisfies any goal or preference of the customer.

As an example, the type of transaction and/or the customer's purchase history could be analyzed by the financial entity in order to select the account for the withdrawal funds for the payment request. For instance, if the payment request is a rent-related request, and the customer's history indicates that all rent payments are made from a certain account, the money for the purchase could be deducted from that account, regardless of the payment device used to initiate the payment request. To that end, the machine learning model used to decide which account(s) to withdraw from can be trained on data such as customer spending histories (both individually and in aggregate), demographic information, impact of purchases on account balances, etc. The model may also incorporate user-defined rules (e.g., pay my rent from this account, or other personal controls), while still optimizing for reducing the costs to the customer. For example, if not enough money is in the rent account (or withdrawal from that account would other incur a cost or negative effect) to respond to a payment request, the transaction approval system could take one of several other actions, such as (a) withdrawing all of the funds from a different account of the customer, (b) splitting the request over multiple accounts of the customer, (c) extending a line of credit, i.e., providing an advance to the customer, or (d) deferring or delaying the withdrawal of the funds (while still approving the payment request) from either a single account or multiple accounts to a future time to account for future predicted deposits/changes in one or more accounts of the customer. In one embodiment, the artificial intelligence (AI) and machine learning models may have both online and offline components, built on global clustering bases and person-to-person bases.

In another embodiment, the nature of a customer's spending activity can be assessed by considering transaction characteristics of the payment request. In one embodiment, a transaction characteristic may include a category of goods or services and a particular customer account associated with the merchant (or vendor) initiating the transaction. In some embodiments, a transaction characteristic may include one or more categories associated with the particular products or services purchased in the transaction and corresponding accounts of the customer used for those purchases. In some embodiments, the categories may be assigned by any of the merchant, the customer, or the transaction approval system. Transaction characteristic information may be used in some implementations to enable the transaction approval system to make real-time decisions as to which customer account to use for a payment request, for example, as a measurement or characterization of transaction purpose considered alongside historical customer activity. In still other embodiments, transaction characteristic information may be stored in one or more memories of the system, and aggregated or individual metrics may be generated and used by the transaction approval system based on an analysis of this information.

In contrast to conventional solutions, the techniques described herein act in addition to a standard transaction approval process performed by an issuer bank. In other words, the approval of the transaction and the selection of a customer account occur together when deciding to approve a transaction. The selection of a customer account (or accounts) can be made such that the selected account (or accounts) have sufficient funds to complete the transaction. The selection of the customer account(s) described herein is made automatically and does not require human consideration. The automated consideration of which account to use can be done based on the system's detailed analysis of the customer and their historical data with the financial entity, aggregated historical data over several customers, characteristic qualities of the specific transaction or the associated merchant, and the like. In addition, the transaction approval system can perform this additional account selection process within the standard time limits required for the real-time processing of a payment device (e.g., 200 ms or less).

Figure 1:
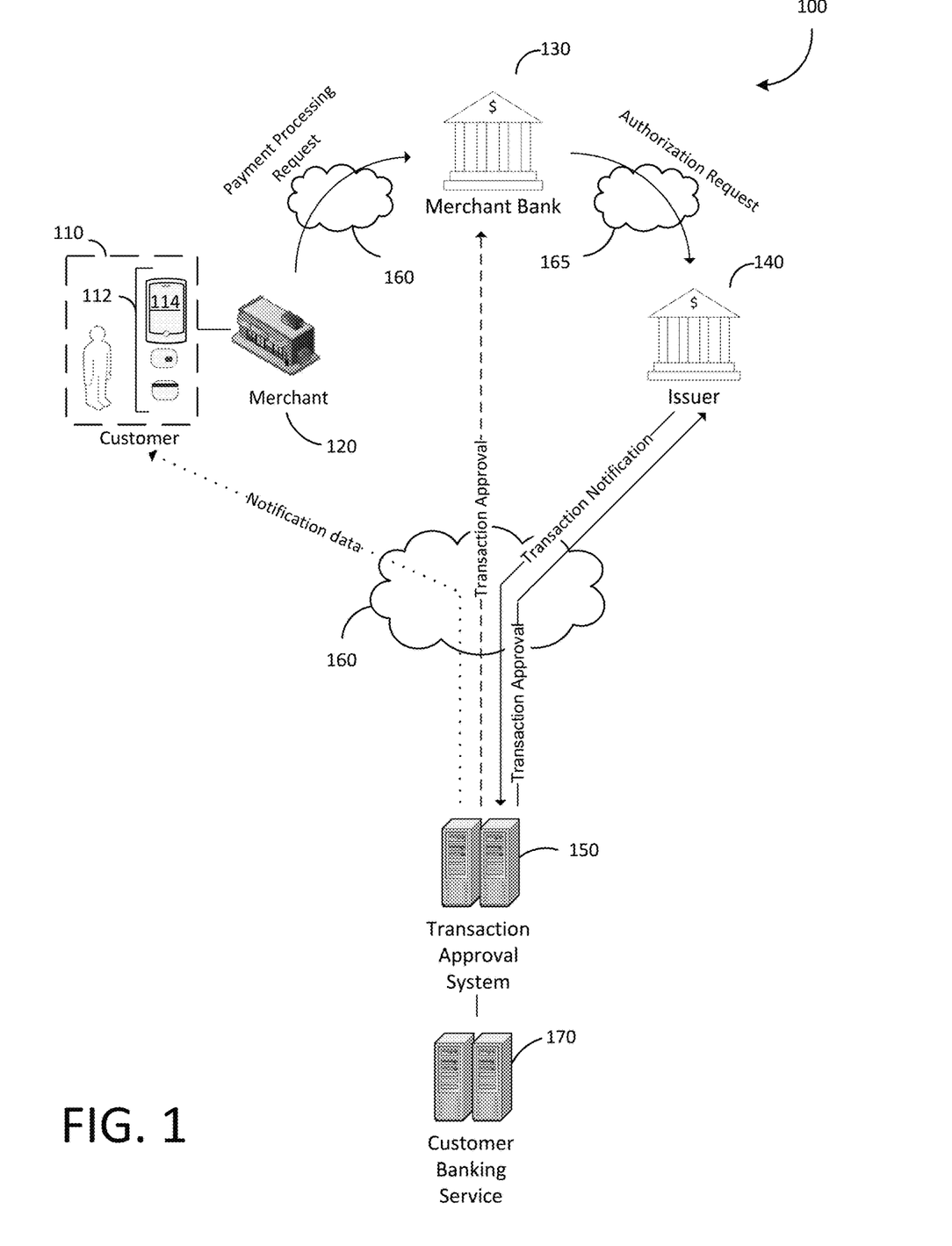
FIG. 1 depicts an environment for authorizing processing of payment transactions in accordance with some embodiments of the present disclosure.

FIG. 1 depicts, in accordance with an embodiment of the present disclosure, an environment 100 for approving and processing financial transactions. Environment 100 may include one or more customers 110 who may initiate a payment transaction using a payment device 112 associated with the customer's bank account, or, in some embodiments, more than one bank account. Payment device 112 may be any of, for example, a payment card having a magnetic strip that is swiped in a magnetic reader of a payment reader, a payment device having a Europay/MasterCard/Visa (EMV) chip that is inserted into a corresponding EMV slot of a payment reader (e.g., a credit or debit card, a gift card, a proxy card, etc.), and near field communication (NFC) enabled devices such as a smart phone or EMV card that is tapped at a payment reader and that transmits payment information over a secure wireless connection. The term "customer" (also referred to herein as a "user" of a transaction processing system) may be any individual or entity that may purchase or intend to purchase a product or service from a merchant 120. A customer 110 may also have one or more customer devices 114 (which in some embodiments, may also act in whole or in part as payment device 112), which may be, for instance, a mobile phone such as an iPhone or Android device, an iPad or tablet device, a laptop or touchscreen device, a PC or stationary computing device, or any other practical device that can communicate via a communication network. In an embodiment, customer device 114 may be any device capable of receiving information over one or more communications networks. Customer 110 can use their device 114 to access, view, and/or take action in response to delivered content. In an embodiment, the user device 114 presents information to a user via a display on or connected to the device 114, and takes input from the customer in relation thereto (for example, through interactive graphics or hyperlinks) via a touchscreen, mouse, keyboard, stylus, or any other appropriate input device. For example, customer device 114 may be capable of receiving and displaying notification data via a dedicated application (app) or website, email, instant messaging, voice, short message service (SMS), voicemail, or any other appropriate type of communication.

Environment 100 may also include one or more merchants 120. The term "merchant" may be understood to encompass any business or other entity that sells, leases, or otherwise provides goods or services to customer 110 as part of a financial transaction, an ATM or other device/system with a cash-back function, a bill pay system (e.g., system for sending checks, wires), an automated clearing house (ACH), a party to one or more peer-to-peer payments, or any other entity or representative party or object engaging in a payment transaction with the customer 110. In an embodiment, merchant 120 may use one or more devices capable of taking in payment information related to the customer's payment device 112. Payment device 112 can be associated with at least one financial account held by the customer, such as a bank account.

When a transaction between the merchant 120 and customer 110 is initiated through the swipe/insertion/tap of the payment device 112 or the input of information of the payment device 112, a merchant may send a request to process the payment to the merchant's acquiring bank 130. Merchant bank 130 may be made up of one or more bank servers. Merchant bank 130 sends the transaction to a card issuer system 140 of the payment device for authorization or approval of the transaction. Card issuer system 140 (also referred to herein as an "issuing bank") may include any number of computing servers that manage the payment networks on which the payment device 112 works.

The issuer system 140 may communicate the transaction information, directly or indirectly, to one or more transaction approval systems 150 as part of a transaction notification. In one embodiment, card issuer system 140 and transaction approval system 150 are managed by different entities (for example, card issuer system 140 may be managed by, e.g., a customer banking entity that approved the card issuance to the customer 110, while system 150 may be managed by, e.g., a partner entity to the card issuer 140), however, in other embodiments, card issuer system 140 and transaction approval system 150 may be part of a payment system operated by a single entity (e.g., an entity that both issues payment devices and performs separate transaction processing activities). In one embodiment, such a payment system (not specifically illustrated) may include any suitable number of servers operated by any suitable entities. The merchant bank 130, card issuer system 140, and transaction approval system 150 communicate payment and transaction information to determine whether the transaction is authorized.

Transaction approval system 150 includes one or more computing servers that may be owned or managed by a customer bank (e.g., the bank associated with the account linked to payment device 112), or in other embodiments, another financial entity such as a customer banking system. In some embodiments, the card issuer system's communication of the transaction information to the transaction approval system 150 is a request through which the issuer system 140 is outsourcing or deferring an authorization determination to the transaction approval system 150. In other embodiments, the issuer system 140 may communicate whether the issuer system 140 has approved or denied the request, along with the transaction information, providing an opportunity to the transaction approval system 150 to check the issuing bank's decision. In one such embodiment, the transaction approval system 150 has the opportunity to analyze the transaction information and make an independent decision thereon, overriding the issuing bank's decision on the transaction. For instance, a scenario may exist where the issuer system 140 declines to process the transaction, and the transaction approval system 150 overrides or supplants the issuing bank's decision with its own transaction approval. In some embodiments, the transaction approval system 150 may fund an overdrawn amount independently of the issuing bank 140, and in other embodiments, the transaction approval system 150 may instruct the issuing bank 140 (or another financial entity) to fund the transaction.

The components of environment 100 may communicate with each other over a communication network 160. Although communication network 160 may be any suitable communication network, in one embodiment, communication network 160 may be the Internet and payment and transaction information may be communicated in an encrypted format such by a transport layer security (TLS) or secure socket layer (SSL) protocol. In addition, when the network 160 is the Internet, any of the components of environment 100 may use the transmission control protocol/Internet protocol (TCP/IP) for communication. In some embodiments, merchant bank 130 may communicate with the card issuer system 140 via one or more payment card networks 165, e.g., a network managed by an entity such Visa, MasterCard, American Express, Discover, or any other similar card networks.

It will be understood that while, for ease of illustration, FIG. 1 depicts one customer 110, one payment device 112, one mobile device 114, one merchant 120, one merchant bank 130, one card issuer system 140, and one transaction approval system 150, environment 100 is not limited to that configuration. In various implementations, any number of merchants, customers, or devices may be used in any number of configurations. Further, while FIG. 1 illustrates a card or NFC based payment device used with a merchant, other embodiments may exist where any device associated with a financial account may be used in any transaction involving the deduction of funds from that financial account (whether or not initiated by a merchant), e.g., transactions conducted at an ATM, a merchant cash register, or other device permitting a cash-back function), bill pay, checks, wires, automated clearing house (ACH), peer-to-peer payments In one embodiment, the entity that manages the transaction approval system 150 is a financial entity, such as a customer banking service 170 for managing the customer's financial account associated with the customer's payment device 112. In such an embodiment, customer banking service 170 may also manage one or more user-facing systems. Customer 110 may, via a dedicated application (app) or website accessed on their mobile device 114, be a user of such a user-facing system, such that customer 110 can interact with customer banking service 170, for example to check or manage account status, make deposits or withdrawals, and the like. In some embodiments, the transaction approval system 150 may withdraw the funds necessary for the financial transaction from one or more accounts held by the customer 110, which account(s) may or may not be the account associated with the payment device 112.

In some embodiments, one or more remote processing servers (not specifically shown in FIG. 1) may be configured in a position intermediate to, or between, the card issuer system 140 and the transaction approval system 150, to expedite or facilitate transaction handling. Further, while only one transaction approval system 150 is illustrated (for ease of reference) in FIG. 1, alternate embodiments may exist where multiple transaction approval systems 150 are included in environment 100, and a remotely-located intermediate processing server may direct or distribute transaction processing between these servers, for purposes of expediency, efficiency of computing resources, and/or redundancy.

Figure 2:
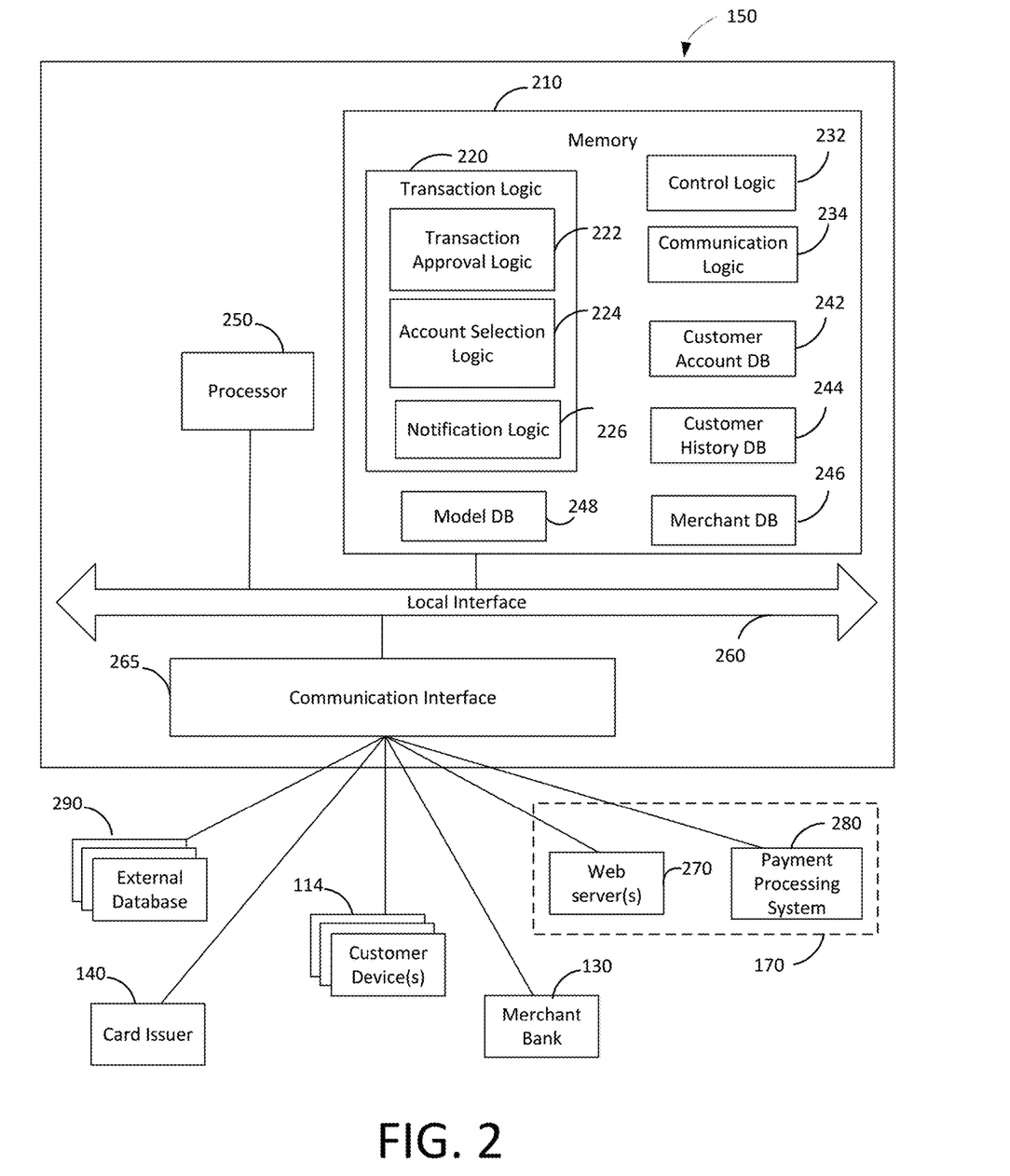
FIG. 2 depicts a block diagram of selected component parts of a transaction approval system in accordance with some embodiments of the present disclosure.

FIG. 2 depicts an example schematic diagram of certain components of a transaction approval system 150 in accordance with some embodiments of the present disclosure. The transaction approval system 150 may include a memory 210. As used herein, memory 210 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memory 210 may store instructions used in the systems and methods described herein. While FIG. 2 illustrates a single discrete memory 210, it will be understood that the embodiments described herein are not limited to any particular arrangement and that other embodiments may store information in one combined memory, or with information stored in a different configuration in one or more memories, some local to the other components illustrated in FIG. 2 and/or some shared with, or geographically located near, other remote computing systems.

The illustrated embodiment of FIG. 2 depicts a number of modules stored in memory 210, specifically, transaction logic 220 (including transaction approval logic 222, account selection logic 224, and notification logic 226), control logic 232, and communication logic 234. These depicted modules may variously represent one or more algorithms, computational models, decision making rules or instructions, or the like implemented as software code or computer-executable instructions (i.e., routines, programs, objects, components, data structures, etc.) that, when executed by one or more processors 250, program the processor(s) to perform the particular functions of their respective logic. These modules are depicted in FIG. 2 as several discrete components, each labelled as an individual "logic", however, in various embodiments, the functions of each respective logic may be executable on their own or as part of one or more other modules; that is, any configuration of the depicted logical components may be used, whether implemented by hardware, software, firmware, or any combination thereof. The capabilities of these various logics are described in greater detail below.

The transaction approval system 150 may include control logic 232, including one or more algorithms or models for generally controlling the operation of the transaction approval system 150. The memory 210 may also, in one embodiment, include communication logic 234, including one or more algorithms or models for obtaining information from or communicating information via network 160. The transaction approval system 150 may, via communication interface 265, operate to exchange data with various components and/or devices on the network 160 or any other network. For instance, communication interface 265 and communication logic 234 may be used (by, e.g., transaction approval logic 222, account selection logic 224 and/or notification logic 226 in the manner(s) described in greater detail below), to access data from or send information to any of card issuing system 140, one or more customer devices 114, a merchant bank 130, one or more external databases 290, one or more web servers 270, and/or one or more payment processing systems 280. In some embodiments, communication logic 234 may use APIs provided by these external entities to obtain their respectively stored data or transmit data to their systems, however, other methods of data collection/transmission may alternatively be used such as one or more software development kits, which may include, e.g., one or more application programming interfaces (APIs), web APIs, tools to communicate with embedded systems, or any other appropriate implementation.

In the embodiment of FIG. 2, one or both of web server 270 and payment processing system 280 may be owned or managed by a single entity, such as a customer banking service 170. In some embodiments, customer banking service 170 may also own or manage transaction approval system 150, such that transaction funding decisions made by system 150 may be sent to payment processing system 280 and funds in line with those decisions may be deducted from an account at customer banking service 170 associated with the payment device 112. Information or notifications regarding the transaction and/or the customer account may be displayed to the customer 110 via one or more user interfaces transmitted to user device 114 via web server 270.

While communication logic 234 is illustrated as being a separate logical component, in an alternative embodiment, the transaction approval system 150 may include communication logic 234 as part of transaction logic 220. In another alternative embodiment, the communication logic 234 may communicate with third-party systems and/or may coordinate with the control logic 232 to read or write data to memory 210 or to another data repository (not shown) within the transaction approval system 150.

In some embodiments, transaction approval system 150 may be implemented in whole or in part as a machine learning system (e.g., neural network software) for achieving the functionalities described herein. In one embodiment, one or more of transaction approval logic 222, account selection logic 224, and notification logic 226 (or any subset of any of those logics) may be implemented at least in part as one or more machine learning algorithms, as described in more detail below.

While, in the embodiment of FIG. 2, each of transaction logic 220, transaction approval logic 222, account selection logic 224, notification logic 226, control logic 232, and communication logic 234 is depicted as part of transaction approval system 150, these logical components need not be so configured, and in other embodiments, other configurations of the various components within transaction approval system 150 or distributed over one or more computing systems, are possible. Transaction logic 220, transaction approval logic 222, account selection logic 224, notification logic 226, control logic 232, and/or communication logic 234 may be variously implemented in software, hardware, firmware or any combination thereof. In the transaction approval system 150 shown in FIG. 2, these logics are implemented in software and are stored in memory 210 of the transaction approval system 150. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus.

The logics of the transaction approval system 150 depicted in FIG. 2 may be executed by one or more conventional processing elements 250, such as a central processing unit (CPU), digital signal processor, other specialized processor or combination of processors, or other circuitry that communicates to and drives the other elements within the transaction approval system 150 via a local interface 260, which can include at least one bus. As an example, the processor 250 may execute instructions of software stored in memory 210, such as transaction logic 220, transaction approval logic 222, account selection logic 224, notification logic 226, control logic 232, and communication logic 234. While FIG. 2 illustrates one processor 250 which implements all of the various logics in the transaction approval system 150, it is possible in other embodiments for the system 150 to employ multiple processors. In one such alternate embodiment, discrete processing elements may be used for each of (or any subset of) transaction logic 220, transaction approval logic 222, account selection logic 224, notification logic 226, control logic 232, and communication logic 234, or any portions or subsets of those logics. In some embodiments, the processing of system 150 is not limited to being performed by a processing element connected to the local interface 260, but instead, any portion of processing in support of the various logics of transaction logic 220 may be distributed over one or more computer systems that may be remotely located. In some embodiments, the processor 250 may comprise an artificial neural network or other type of configuration for performing machine learning functions based on instructions stored in memory 210.

Memory 210 may be configured, in some embodiments, to include a customer account database 242 that stores account information related to one or more customer accounts with a single financial entity (e.g., a customer banking service 170 or, in other embodiments, a bank) that owns or manages system 150 or partner financial entities. Such information would include data regarding the account corresponding to payment device(s) 112 used by customer 110 in purchase transactions with merchant 120. In some embodiments, customer account database 242 may include one or more tables, each entry corresponding to a unique set of account information. In some embodiments, customer account database 242 may include information about a customer and/or a related account, such as a unique account ID, an associated customer ID, a current account balance, and information regarding pending deposit/withdraw activity, if existent, customer name, contact information (e.g., email address, mailing address, telephone number, etc.), date of birth, payment card information (e.g., payment card number, expiration date, cardholder name, security code) for each of any number of associated payment cards, customer account settings and/or preferences, and the like. Customer account database 242 may, in some embodiments, store information detailing every transaction made or requested in connection with the customer's account(s), including any of approved transactions, rejected transactions, withdrawn transactions, pending transactions, refunded transactions, and the like, along with account balances resulting from such transactions.

Figure 3:
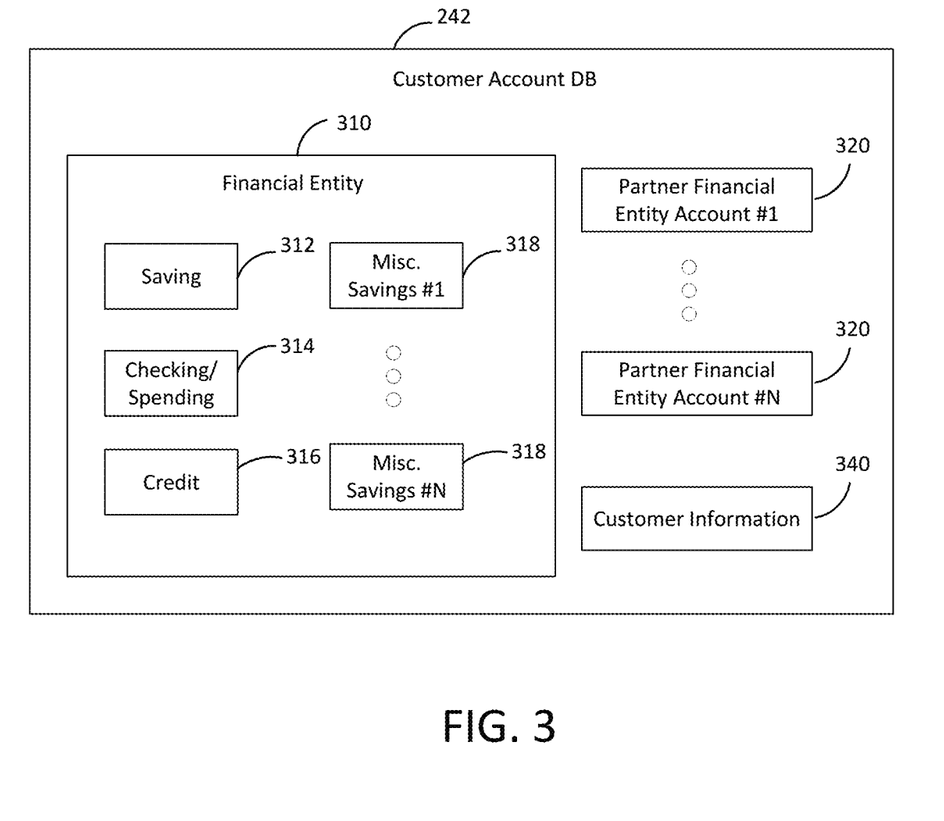
FIG. 3 depicts a block diagram of selected components of a customer account database in accordance with some embodiments of the present disclosure.

In the embodiment of FIG. 3, the customer account database 242 can include information about customer accounts 310 with the financial entity and information about other customer accounts 320 with partner financial entities that have been linked by the customer in the customer account database 242. The customer accounts 310 can include a primary spending account 312, a checking/spending account 314, a credit account 316 (e.g., a credit card account) and one or more miscellaneous savings accounts 318. The miscellaneous savings accounts 318 may be used by the customer to save for a specific purpose. Some examples of miscellaneous savings accounts 318 may include housing related accounts (e.g., for rent payments or for a house purchase), vehicle related accounts (e.g., for a vehicle purchase or for vehicle repairs), planned spending accounts (e.g., for a vacation or for holiday shopping) or other similar types of accounts where the customer is saving for a specific purpose. While certain types of accounts are shown in customer account database 242, customer account database 242 may include fewer accounts, more accounts or different types of accounts.

In addition, the customer account database 242 can also store customer information 340 that includes information about the customer such as customer preferences (or rules) relating to the customer accounts 310 and/or customer goals. In an embodiment, the customer may establish preferences (or rules) relating to: the number of times a particular customer account 310 may be used in a predetermined time frame (e.g., the customer account may be used for 5 transactions a week); the type of transaction used with a particular customer account 310 (e.g., the customer account may only be used with a particular merchant or group of merchants); the amount of funds that may be withdrawn from a particular customer account 310 in a single transaction (e.g., the customer account may be used for transactions of $500 or less); the amount of funds that may be withdrawn from a particular customer account 310 in a predetermined time frame (e.g., the customer account may be limited to transactions totaling a $1000 a week); and/or the priority of customer accounts in satisfying payment requests (e.g., a particular customer account may be designated to be used for payment requests before any other customer account may be used). In addition, the customer may be provided with a user interface that permits the customer to enter preferences (or rules) for the customer's accounts and in some embodiments, to assign weights or priorities to the preferences or rules. In another embodiment, the customer (or the transaction approval system 150) may establish goals relating to: avoiding or minimizing transaction fees or costs; maximizing a balance in a particular customer account 310 (e.g., the customer may want to maximize the balance of a housing related savings account 318 for a subsequent purchase); and/or maximizing interest income from interest-earning customer accounts 310 (e.g., the customer may want to keep finds in interest-earning accounts to maximize interest income).

Referring back to FIG. 2, memory 210 may also include a customer history database 244 that stores real-time and/or historic information relating to any of: customer account creation/removal/edits, deposit/withdrawal activity (e.g., dates of activity, amount of deposit/withdrawal) on each of the customer accounts, activity by any users that may have shared or joint accounts with the customer, customer financial health metrics or scores, purchases, made or pending, using payment devices tied to any of the customer's accounts, customer activity on one or more user interfaces delivered by web server 270, and/or metrics generated on any of the above such information, whether based on an individual account or user, or in aggregate.

Memory 210 may also store a merchant database 246 that stores information related to one or more merchants. In an embodiment, the information in merchant database 246 may contain information for all or a subset of the merchants associated with the transactions with any customer account stored in customer account database 242. Other embodiments may exist where the data in merchant database 246 is collected from another source, such as a third-party aggregation system, one or more merchant banks, or from the merchants 120 themselves. In still another embodiment, merchant data may be collected from the customer via a user interface delivered to them by web server 270. In some embodiments, merchant database 246 may include information uniquely identifying each merchant, such as a merchant ID, merchant name, contact information (e.g., email address, mailing address, telephone number), merchant bank information, and the like. In some embodiments, merchant database 246 may include information categorizing/classifying the merchant, or the merchant's product(s) or inventories, into one or more purchase categories. In some embodiments, transaction approval system 150 may assign weights or importance to different categories of merchants or goods. In some embodiments, such weights may be stored in merchant database 246 in connection with the corresponding categories.

In an embodiment, system 150 may update information in databases 242, 244, and/or 246 based on data collected from web server 270. In the embodiment of FIG. 2, web server 270 is remote from system 150 and therefore such information is collected via communication logic 234. In other embodiments, web server 270 may be local to, or integral with, system 150 and such data may be accessed over a local interface 260. Web server 270 may transmit information to and receive data from one or more user devices 114. In an embodiment, web server 270 is owned and/or managed by the same banking entity as transaction approval system 150 (e.g., a customer banking service 170), however other configurations may exist in other embodiments. In an embodiment, web server 270 can deliver, to user device 114, a user interface that provides the customer the ability to perform one or more banking-related functions, which may include any or all of: management of financial accounts (e.g., checking/savings accounts), viewing of account statements or metrics, receiving financial alerts/notifications, making deposits/withdrawals, direct deposit, bill pay, money transfer, check deposit, establishing one or more goals or preferences (including possibly assigning weights or priorities to the goals or preferences) for the customer's accounts and/or any other relevant activities. In some embodiments, the data presented to the user device 114 may be generated based on data stored in customer account database 242 or customer history database 244, however, in other embodiments, such data may be collected from one or more databases on system 150 or an external system.

While the term "database" or "repository" is used with reference to elements 242, 244, 246, 248 and 290, these components are not so limited nor is any particular form or configuration of data storage mandated, and the described "databases" may alternatively be an indexed table, a keyed mapping, or any other appropriate data structure.

In some embodiments, as users make edits, changes, view, search, click, interact with, or otherwise engage in activities with the user interface provided by web server 270, such activity may be stored in customer history database 244 and/or customer account database 242 as indicators that may be considered, individually or in aggregate, in an analysis of customer 110's engagement. In some embodiments, this information may be understood as a customer's user engagement metrics or behavioral biometrics. In some embodiments, some of the data in customer history database 244 may collected from one more external (that is, third-party) databases or websites 290 (e.g., media, commercial, or other websites, collected via communication logic 234) to determine whether and how a customer has followed or communicated regarding the entity managing transaction approval system 150 (which may be, e.g., a customer bank), referrals that the customer has made to other potential customers, or similar considerations that may indicate a higher or lower level of customer engagement.

The data stored in customer history database 244 and external databases 290 is used by transaction logic 220 to make an assessment in real time as to whether to approve a purchase transaction initiated by the customer 110 using payment device 112 and to select the account(s) of the customer that will be used to fund the purchase transaction. Transaction logic 220 may perform this analysis even if it is determined that the customer does not have sufficient funds to complete the transaction. In that case, if the transaction is authorized by the transaction logic 220, a customer 110 may be advanced the funds, up to an approved amount, required to complete the transaction initiated by the customer. In some embodiments, this approved amount is determined in advance, and in other embodiments, it is determined in real-time.

Account selection logic 224 derives the selection of the customer account using one or more machine learning models stored at model database 248. The models are trained using training data, e.g., data that is representative of selecting a customer account for a particular goal. For example, account selection logic 224 may identify previous customers as having similar accounts and goals and use the data associated with the previous customers to train the models. By identifying the account selections for users that have been successful in obtaining particular goals, account selection logic 224 may infer and make account selections for customers who follow a similar behavior. Further, models may also be trained by segmenting customers into groups. A customer might be similar to a group of customers that has similar types of accounts or goals, but dissimilar to other customers. By identifying the characteristics of the group, account selections can be made to provide additional benefits to the customer while still accomplishing the goal for the customer. In an embodiment, model database 248 may include heuristic models for making an account selection.

When changes occur to the customer accounts in the customer account database (e.g., account openings, account closings or significant changes in the balances of existing accounts), the account selection logic 224 can reapply the models in model database 248 and the corresponding input considerations when making a subsequent selection of a customer account for a subsequent transaction, even if the transaction is identical or nearly identical to a prior transaction. The account selection logic 224 can use input considerations such as account balances, customer goals and preferences and cost information for certain types of transactions. The changes to the customer's accounts may result in the account selection logic 224 selecting a different account to accomplish a stated goal even if the transaction is similar to prior transactions that used other accounts.

In addition, the account selection logic 224 can determine whether the customer has adequate funds among all of customer's accounts to satisfy a payment request. If the customer has sufficient funds for a payment request, the account selection logic 224 can then select the appropriate account (or accounts), as discussed above, to satisfy the payment request and accomplish the stated goal. In other embodiments, one of the customer's accounts may be a line of credit such that the withdrawal funds from the account may be a loan to the customer. If the customer does not have sufficient funds for the payment request, the account selection logic 224 may advance some or all of the funds for the payment request in one embodiment and may make a request for an ACH transfer from one of the partner financial entity accounts 320 in the customer account database 242 or may make a request for repayment from the customer. Alternatively, the customer may be permitted to maintain a negative account balance (e.g., overdraw the account) to satisfy the payment request. The customer may be permitted to have a negative account balance if the customer receives regular deposits that would subsequently result in a positive account balance. In an another embodiment, the payment request can be denied or placed on hold if the customer does not have sufficient funds. In a further embodiment, even if the customer has sufficient funds for the payment request, the payment request may be denied or placed on hold, if withdrawal from a particular account to meet the funding goal would counter the customer's explicit or implicit goals or preferences, or would result in a penalty or negative impact on the customer's account(s) or financial health that would outweigh non-payment of the payment request.

Notification logic 226 can be used to send the customer a notification as to which account was used to provide the funds in response to a payment request. The notification logic 226 may use information from customer account database 242 and customer history database 244, such a unique user identifier, a unique account identifier, a current account balance, an account balance after a pending withdrawal (the transaction), a unique transaction ID, and/or one more pieces of information associated with the transaction (such as a merchant identifier, date/time, etc.), when generating the notification for the customer. In an embodiment, notifications are sent by notification logic 226 to customer device 114. This notification may variously take the form of a transmission, through web server 270, to device 114, e.g., via a dedicated application (app) or website, or may occur separate from web server 270, such as in a transmission email, instant messaging, voice, SMS, voicemail, or any other appropriate type of communication.

Figure 4:
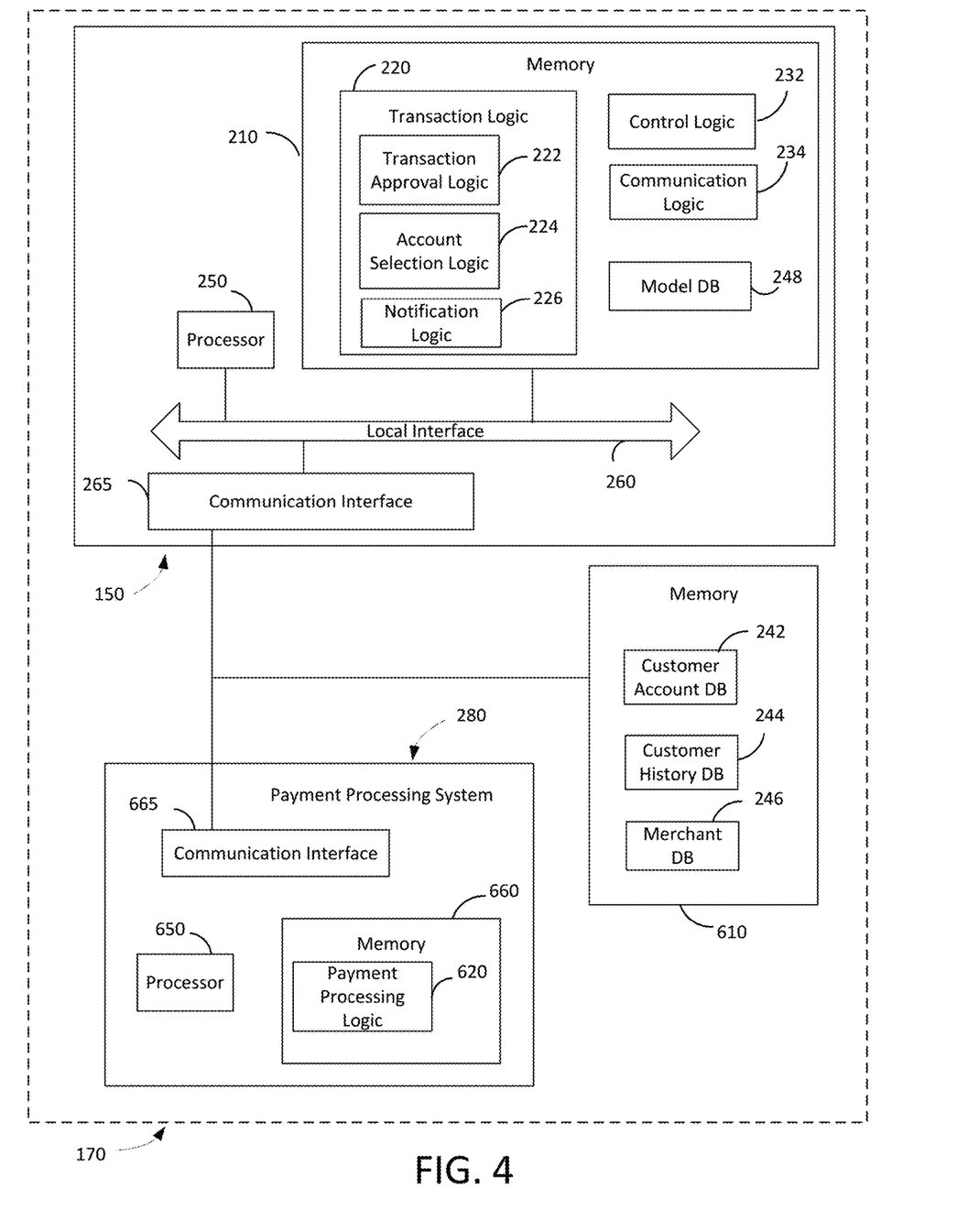
FIG. 4 depicts a block diagram of selected component parts of an alternate transaction approval system in accordance with some embodiments of the present disclosure.

In an alternate embodiment illustrated in FIG. 4, databases 242, 244, and 246 are not stored in transaction approval system 150 itself, but are remotely stored in a shared memory 610 so as to be accessible via one or more communication networks, such as a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network, or any combination thereof. In some embodiments, the databases 242, 244, and 246 may be accessible over the Internet and payment and information may be communicated between system components in an encrypted format such by a transport layer security (TLS) or secure socket layer (SSL) protocol. In the embodiment of FIG. 4, both transaction approval system 150 and payment processing system 280 are owned or managed by customer banking service 170, and both systems 150 and 280 may access shared data in memory 610.

As shown in FIG. 4, the payment processing system 280 may include a memory 660, similar to memory 210 described above, that stores information and instructions that are accessible by processor 650. In one embodiment, processor 650 can be similar to processor 250 described above. The memory 660 can store one or more modules, specifically, payment processing logic 620. These depicted modules may variously represent one or more algorithms, computational models, decision making rules or instructions, or the like implemented as software code or computer-executable instructions (i.e., routines, programs, objects, components, data structures. etc.) that, when executed by one or more processors 650, program the processor(s) to perform the particular functions of their respective logic. The payment processing system 280 has a communication interface 665 that permits the payment processing system 280 to communicate with the transaction approval system 150 and the shared memory 610. Since both systems 150 and 280 can communicate with shared memory 610, either of systems 150 or 280 can update the data in databases 242, 244, and 246, such that the updated information is available to the other system.

Figure 5:
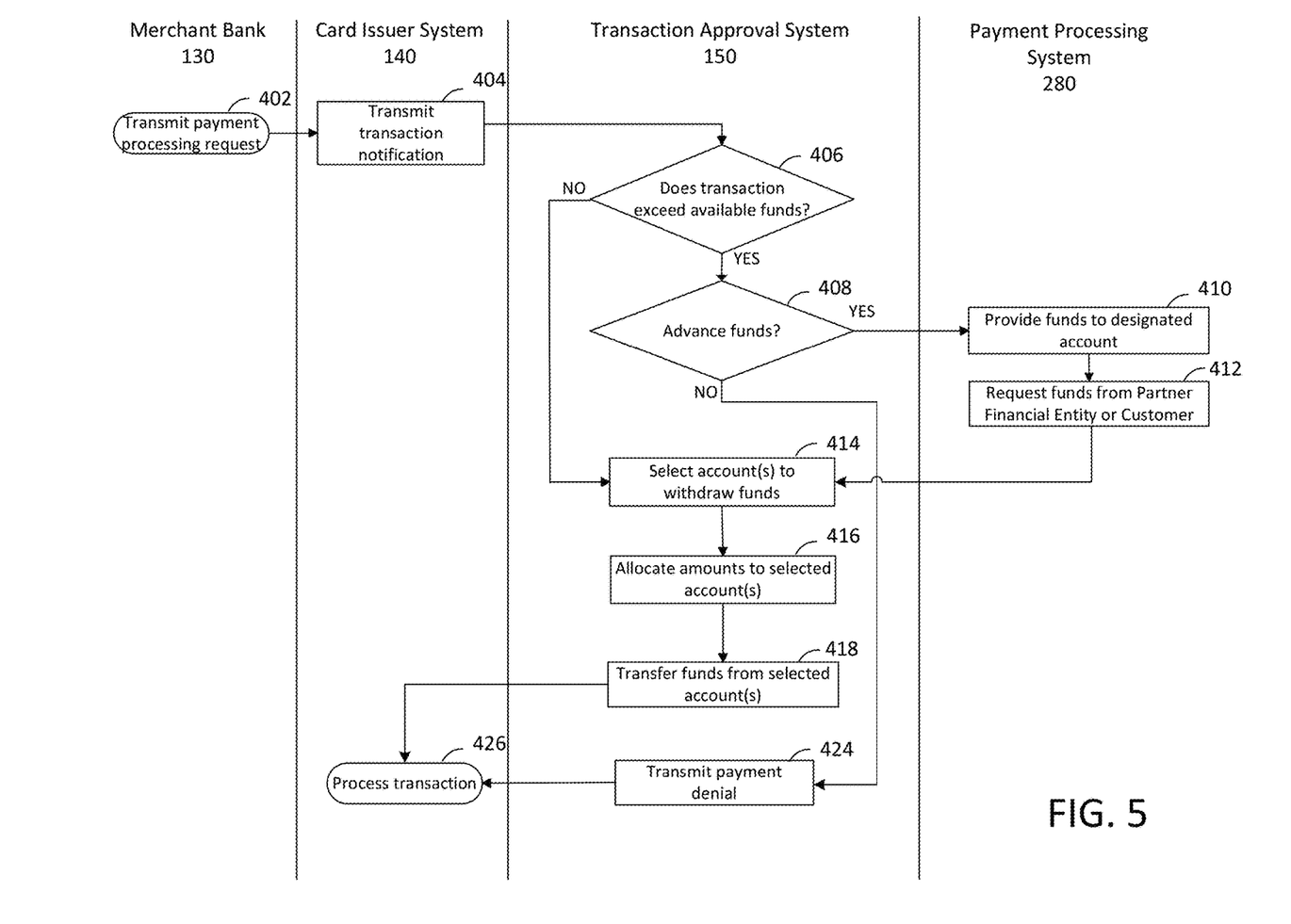
FIG. 5 depicts a flow chart of a transaction approval process in accordance with some embodiments of the present disclosure.

An embodiment of the real-time account selection in a transaction approval process is illustrated in FIG. 5. After a transaction between the merchant 120 and customer 110 is initiated through the swipe/insertion/tap of the payment device 112 (or through the entering of payment information), the merchant 120 transmits a request to process the payment transaction to the merchant's acquiring bank 130, which in turn sends the transaction processing request to card issuer system 140 (step 402). Card issuer system 140 transmits information for the payment transaction to the transaction approval system 150 for authorization or approval of the transaction (step 404). In some embodiments, the transmission between issuer system 140 and transaction approval system 150 is indirect, with one or more intermediate servers facilitating transmission.

Initially, the transaction approval logic 222 determines whether the transaction amount exceeds the current balance of the customer accounts 310 held by the customer at the financial entity. This is done by reference to the account balances for the customer accounts 310 stored in customer account database 242 and regardless of whether the payment device 112 is linked to a particular customer account (step 406). In some embodiments, the transaction approval logic 222 may first determine whether a single, default or preferred account (e.g., one associated with the card) has a sufficient balance prior to an analysis of multiple customer accounts 310. In a case that the balances do exceed the cost of the transaction (NO in step 406), the transaction is generally approved, and the process proceeds to step 414, in which the account selection logic 224 uses one or more machine learning models to select one or more accounts from the customer accounts 310 to fund the transaction. The machine learning model(s) can receive information on one or more of the customer's accounts, user preference information (including weights or priorities, if provided), information regarding the transaction and/or information regarding prior transactions by the customer as inputs. In some embodiments, the machine learning models may identify group or cluster sets of customers (e.g., various banking clients) or customer accounts with similar characteristics to the customer based on similarities in their user and transaction histories (e.g., using a K-means clustering algorithm or another alternate thereto), to find patterns between users that may inform the decision as to which account to select. For example, the machine learning models may select one or more types of accounts based on account selections made for other customers that facilitated their respective goals or preferences. The output of the machine learning model(s) may be, for instance, one or more account identifiers and/or information identifying one or more types of account.

In a case that the transaction amount exceeds the current balance of the customer accounts (YES in step 406), the process proceeds to step 408, in which the transaction approval logic 222 and/or the account selection logic 224 determines whether the customer qualifies for an advance of funds. This determination may be done by reference to one or more flags set in customer account database 242 based on the customer's relationship and history with the financial entity. If the customer does not qualify for advance of funds (NO in step 408), a payment denial is transmitted to the issuer system 140 (step 424), and the issuer system 140 processes/handles the transaction appropriately (typically, by denying the transaction) (step 426). If the customer qualifies for an advance of funds (YES in step 408), the process then proceeds to step 410.

Prior to proceeding to step 410, the transaction approval logic 222 and/or the account selection logic 224 can calculate, for the particular requested transaction, the amount needed for the transaction. In an embodiment, this is done by calculating a difference between the total account balance of the customer's accounts (stored in customer account database 242) and the transaction amount. However, in another embodiment, the amount of funds required for the transaction may be greater than the difference between the total account balance of the customer's accounts and the transaction amount because the account selection logic 224 may determine that certain accounts cannot be used to fund the transaction using the machine learning model and the corresponding inputs to the machine learning model. In step 410, the payment processing system 280 transfers the funds from a central/shared account to a designated customer account (similar to a loan). In some embodiments, customer banking service 170 can provide one or more dedicated advance accounts (i.e., the central or shared account) that is not specific to any one customer, that contains a balance of funds available to the customer 110 (or any other customer of the financial entity). After the funds have been transferred to the designated customer account, the payment processing system 280 can request the transferred funds from a partner financial entity account 320 or the customer (step 412). Alternatively, the payment processing system 280 can request repayment of the transferred funds by the customer. The customer may be required to make repayment in a single payment or over several payments and may or may not be charged interest for receiving the transferred funds. In another embodiment, the transfer by the payment processing system 280 may be unconditional, that is, no repayment is required and no charge or penalty is applied (i.e., step 412 can be omitted). In one embodiment, a notification may be sent to the customer 110 (e.g., via device 114), notifying the customer of the transfer of funds and the subsequent request for the funds from the partner financial entity account 320 or the need for the customer 110 to repay the money. In another embodiment, this notification may require confirmation of the advance by the customer 110 prior to the transfer of funds in step 410.

Once the request for the advanced funds in step 412 is completed, the process can resume at step 414 with the selection of the accounts from which the funds for the transaction will be withdrawn. If the advance of funds is for the entire amount of the transaction, the account selection logic can select the designated account that received the funds from the payment processing system 280. If the amount of advanced funds is less than the entire amount from the transaction, the account selection logic 224 can select one or more accounts to provide the remaining funds for the transaction using the machine learning models. The accounts selected by the account selection logic 224 can include the designated account and may include additional consumer accounts 310. After selecting the accounts in step 414, the account selection logic 224 can then allocate the amounts to be taken from each of the selected accounts (step 416). If only one account has been selected that account is allocated the entire amount of the transaction. However, if more than one account has been selected, the account selection logic 224 can use the machine learning models (with the corresponding inputs to the models) to determine an amount to be provided by each of the selected accounts. In one embodiment, the selected accounts may provide an equal share of the transaction amount. However, in other embodiments, the amount allocated to each selected account may be different and dependent of factors such as the amount of funds in each account and/or any limits placed on withdrawals from a particular account (for example, funds may be with withdrawn while maintaining a minimum account balance, avoiding overdrawn accounts, favoring withdrawal from low-yield or low-reward accounts (e.g., those with low interest), etc.). This may be done in addition to or alternatively to the use of the machine learning models. After determining the allocated amounts for the selected accounts, the appropriate funds from the selected accounts can be transferred to the card issuer system 140 (step 418) and the card issuer system 140 can proceed to process the transaction (step 426). In another embodiment, the transaction approval system 150 (or financial entity) may provide the appropriate funds to the card issuer system 140 but delay or defer the withdrawal of the funds from the selected accounts to a later time to account for future predicted deposits/changes in one or more of the customer's accounts.

Unlike conventional solutions, a transaction approval system 150 as described herein performs its automatic account selection based on a detailed analysis of the customer, and of, e.g., historical data for that customer (and/or other customers), aggregated historical data, transaction characteristics or merchant characteristics, customer preferences or goals and the like. What is more, the transaction approval system 150 performs this selection within the set time limits required by the real-time processing of the payment device 112, e.g., 200 ms or less, though the required time may vary in other embodiments. As a result, the system is able to evaluate a quantity and scale of data in real-time that could not be done through traditional banking processes.

The embodiments described herein provide several technical advantages and benefits over existing systems. For example, through automatic monitoring of customer accounts and information, the account selection logic 224 is able to automatically determine which customer account (or accounts) satisfy a customer goal, and to possibly automatically acquire additional funds if the customer's accounts do not satisfy a payment request. The account selection logic 224 additionally, through such monitoring and through the use of machine learning models, provides continually updated account selections based on user activity that satisfies the user's goals.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system for processing a purchase transaction by a customer, the system comprising:
   a memory configured to store a plurality of accounts and, in association with each of the plurality of accounts, (i) a current account balance, and (ii) activity data relating to historical activity, by a customer, on the account; and
   at least one processor configured to:
   receive, from a third-party system, a request to approve a transaction of a requested value, the transaction having been initiated by the customer associated with the plurality of accounts;
   determine whether the plurality of accounts of the customer have funds greater than the requested value;
   train a machine learning model by:
   identifying account selections for customers who have been successful in obtaining particular goals;

segmenting the customers into groups based on a K-means clustering of transaction histories of the customers;

inferring account selections for a cluster set of the customers from the K-means clustering; and feeding, to the machine learning model, training data that is representative of a group of the cluster set of the customers who selected a customer account for achieving a goal the same as at least one customer preference or goal of the customer;

select, using the machine learning model, at least one account of the plurality of accounts to provide the requested value of the transaction based on a plurality of inputs to the machine learning model in response to a determination indicating that the plurality of accounts have greater than the requested value, wherein the plurality of inputs includes the at least one customer preference or goal of the customer and information regarding the plurality of accounts;

detect a change to an account of the plurality of accounts in a customer account database;

based on detecting the change to the account, select, using the machine learning model, a different at least one account of the plurality of accounts to provide the requested value of the transaction based on account balances, the at least one customer preference or goal, and cost information for the purchase transaction; and transfer the requested value from the selected different at least one account of the plurality of accounts to the third-party system.

2. The system of claim 1, wherein the plurality of inputs further includes historical data of the customer and aggregated historical data of several customers.

3. The system of claim 1, wherein the selection of the at least one account of the plurality of accounts to provide the requested value includes selecting two or more accounts of the plurality of accounts and the at least one processor is further configured to determine an amount of the requested value to be provided by each of the two or more accounts.

4. The system of claim 1, wherein the at least one processor is further configured to request additional funds from a partner financial entity in response to a determination indicating that the plurality of accounts have less than the requested value.

5. The system of claim 1, wherein the at least one customer preference or goal includes one or more of:

information regarding a number of times an account of the plurality of accounts is used in a predetermined time frame;

information regarding a type of transaction permitted with an account of the plurality of accounts;

information regarding an amount of funds permitted to be withdrawn from an account of the plurality of accounts in a predetermined time frame; or information regarding a priority of each account of the plurality of accounts.

6. The system of claim 1, wherein the plurality of inputs further includes information regarding prior transactions by the customer.

7. The system of claim 1, further comprising a user interface, wherein the user interface is configured to permit the customer to assign a weight or priority to each customer preference or goal of the at least one customer preference or goal.

8. A method comprising:

receiving from a third-party system, a request to approve a transaction of a requested value, the transaction having been initiated by a customer having a plurality of accounts at a financial entity;

determining whether the plurality of accounts of the customer have funds greater than the requested value;

training a machine learning model by:
identifying account selections for customers who have been successful in obtaining particular goals;

segmenting the customers into groups based on a K-means clustering of transaction histories of the customers;

inferring account selections for a cluster set of the customers from the K-means clustering; and feeding, to the machine learning model, training data that is representative of a group of the cluster set of the customers who selected a customer account for achieving a goal the same as at least one customer preference or goal of the customer;

selecting, using the machine learning model, at least one account of the plurality of accounts to provide the requested value of the transaction based on a plurality of inputs to the machine learning model in response to the determining indicating that the plurality of accounts have greater than the requested value, wherein the plurality of inputs includes the at least one customer preference or goal of the customer and information regarding the plurality of accounts;

detecting a change to an account of the plurality of accounts in a customer account database;

based on detecting the change to the account, selecting, using the machine learning model, a different at least one account of the plurality of accounts to provide the requested value of the transaction based on account balances, the at least one customer preference or goal, and cost information for the transaction; and transferring the requested value from the selected different at least one account of the plurality of accounts to the third-party system.

9. The method of claim 8, wherein the plurality of inputs further includes historical data of the customer and aggregated historical data of several customers.

10. The method of claim 8, wherein the selecting the at least one account of the plurality of accounts to provide the requested value includes selecting two or more accounts of the plurality of accounts and determining an amount of the requested value to be provided by each of the two or more accounts.

11. The method of claim 8, further comprising one of: 1) providing a loan to the customer, or 2) permitting the customer to have a negative account balance in response to the determining indicating that the plurality of accounts have less than the requested value.

12. The method of claim 11, wherein the loan to the customer makes up a difference between a total balance of the plurality of accounts and the requested value.

13. The method of claim 8, wherein the at least one customer preference or goal includes one or more of:

information regarding a number of times an account of the plurality of accounts is used in a predetermined time frame;

information regarding a type of transaction permitted with an account of the plurality of accounts;

information regarding an amount of funds permitted to be withdrawn from an account of the plurality of accounts in a predetermined time frame; or information regarding a priority of each account of the plurality of accounts.

14. The method of claim 8, wherein the plurality of inputs further includes information regarding prior transactions by the customer.

15. The method of claim 8, further comprising notifying the customer of the transfer of the requested value from the selected at least one account.

16. A non-transitory computer-readable storage medium comprising instructions stored therein, which when executed by one or more processors, cause the one or more processors to perform operations comprising:

receiving from a third-party system, a request to approve a transaction of a requested value, the transaction having been initiated by a customer having a plurality of accounts at a financial entity;

determining whether the plurality of accounts of the customer have funds greater than the requested value;

training a machine learning model by:
identifying account selections for customers who have been successful in obtaining particular goals;
segmenting the customers into groups based on a K-means clustering of transaction histories of the customers;
inferring account selections for a cluster set of the customers from the K-means clustering;
and
feeding, to the machine learning model, training data that is representative of a group of the cluster set of the customers who selected a customer account for achieving a goal the same as at least one customer preference or goal of the customer;

selecting, using the machine learning model, at least one account of the plurality of accounts to provide the requested value of the transaction based on a plurality of inputs to the machine learning model in response to the determining indicating that the plurality of accounts have greater than the requested value, wherein the plurality of inputs includes the at least one customer preference or goal of the customer and information regarding the plurality of accounts;

detecting a change to an account of the plurality of accounts in a customer account database;

based on detecting the change to the account, selecting, using the machine learning model, a different at least one account of the plurality of accounts to provide the requested value of the transaction based on account balances, the at least one customer preference or goal, and cost information for the transaction; and transferring the requested value from the selected different at least one account of the plurality of accounts to the third-party system.

17. The non-transitory computer-readable storage medium of claim 16, wherein the instructions stored therein, when executed by one or more processors, cause the one or more processors to further perform operations comprising requesting additional funds from a partner financial entity in response to the determining indicating that the plurality of accounts have less than the requested value.

18. The non-transitory computer-readable storage medium of claim 16, wherein the selecting the at least one account of the plurality of accounts to provide the requested value includes selecting two or more accounts of the plurality of accounts and determining an amount of the requested value to be provided by each of the two or more accounts.

19. The non-transitory computer-readable storage medium of claim 16, wherein the plurality of inputs further includes historical data of the customer and aggregated historical data of several customers.

20. The non-transitory computer-readable storage medium of claim 16, wherein the plurality of inputs further includes information regarding prior transactions by the customer.

* * * * *